Nov. 24, 1925.
C. M. GAUTIER
1,562,754
MACHINE FOR MAKING PNEUMATIC TIRE COVERS OR CASINGS
Filed May 10, 1923
2 Sheets-Sheet 2

Patented Nov. 24, 1925.

1,562,754

UNITED STATES PATENT OFFICE

CLAUDE MARIE GAUTIER, OF LONDON, ENGLAND.

MACHINE FOR MAKING PNEUMATIC-TIRE COVERS OR CASINGS.

Application filed May 10, 1923. Serial No. 638,005.

*To all whom it may concern:*

Be it known that I, CLAUDE MARIE GAUTIER, a citizen of the French Republic, residing in London, England, have invented certain new and useful Improvements in Machines for Making Pneumatic-Tire Covers or Casings, of which the following is a specification.

This invention is for improvements in or relating to machines for applying fabric plies to cores in the making of pneumatic-tire covers: it is also serviceable for applying the beads and rubber to the fabric on the core.

The machines usually employed to place the various plies of fabric on the cores or formers are of a complicated nature and are usually provided with rollers operating at one point only on the periphery of the core so that the core has to be rotated. The present invention has for one of its objects to provide a machine which is of simple construction and which does not require rotation of the core.

It has been proposed to provide a machine having a non-rotatable core wherein annular air-bags arranged round the core are adapted, when inflated, to lay the fabric evenly from the tread portion to the bead portion of the tire.

According to the present invention, there is provided a press element for laying the fabric for a pneumatic-tire cover on a core, which press element is characterized by a plurality of rings having their operative side faces shaped to conform to the required contour of the fabric on the core arranged concentrically one within another and coaxial with the throughway axis of the core, by the rings being free to move in the direction of the said axis, and by the rings being so arranged relatively to the core that they come into contact with the material thereon successively commencing with the outer ring near the tread portion of the tire and finishing with the inner ring near the bead when all the rings are in contact with the material on the core, whereby the material is evenly laid from the tread towards the beads.

Preferably the rings are resiliently mounted for movement in the direction of the said axis on the plateaux of the press (for example in recesses) or in members intended to be used therewith, one on each side of the core.

According to another feature of this invention there is provided for use with a press element as above set forth, a ring member to support a bead on each side of the core, and locate it in position during the laying operation, said ring member being removable to allow further fabric plies to be placed over the bead.

Other features of the invention will be hereinafter more fully described and pointed out in the claims.

In the accompanying drawings which illustrate preferred embodiments of the invention—

The drawings are to some extent diagrammatic. Like reference numerals refer to like parts in the various figures.

Figure 1:
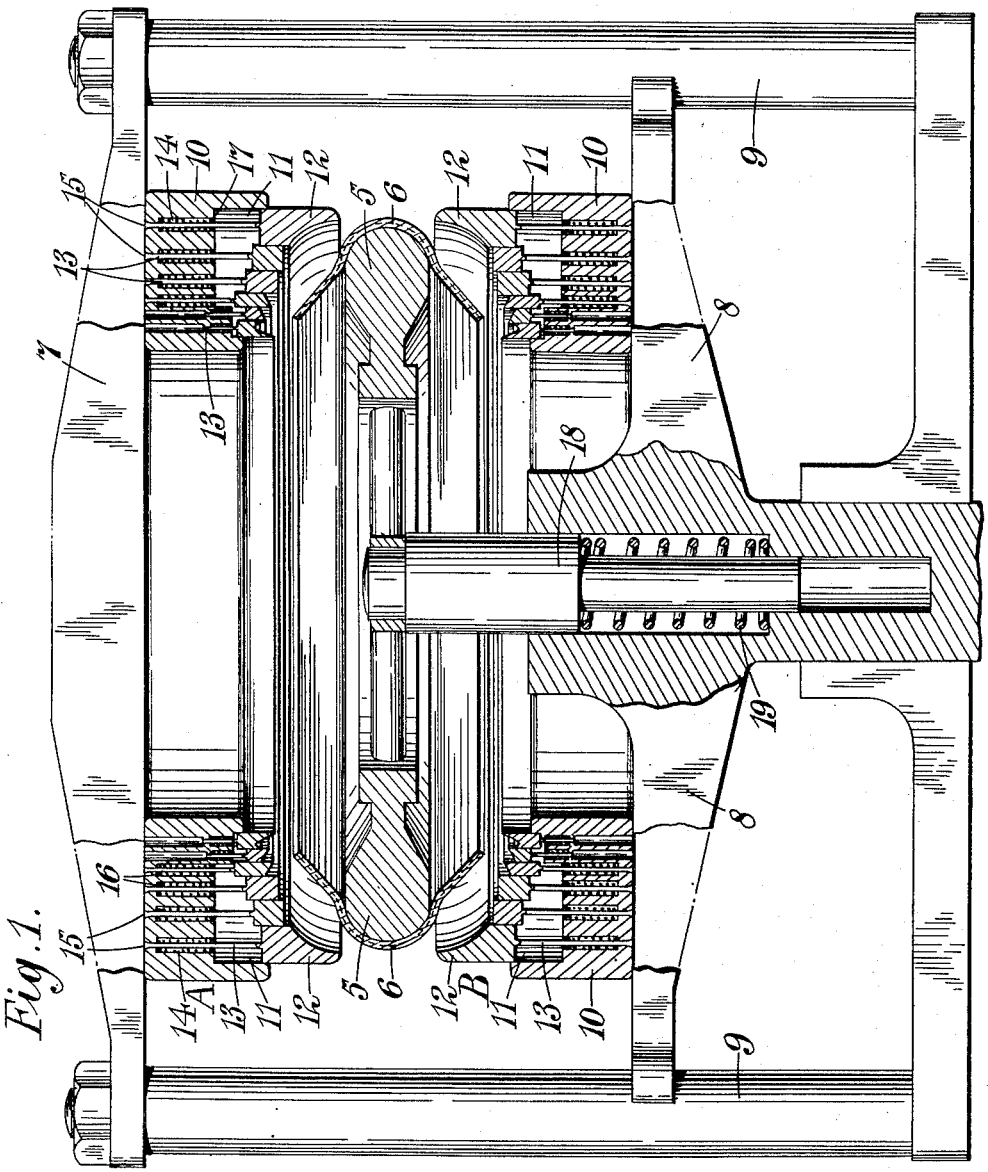
Figure 1 is a central sectional elevation of a press showing the press elements in "open" position.

Two press elements, designated generally A and B respectively, which are arranged one on either side of a core 5, on which is disposed the fabric 6 to be laid, are respectively mounted on the plateaux 7 and 8 of an hydraulic or other press, the lower member 8 of which is movable in the vertical direction and is guided on pillars 9.

Each press element comprises an annular casing member 10 having an annular recess 11 in one side face thereof, in which a number of concentric rings 12 are arranged. The operative side faces of these rings are shaped as shown in the drawings to conform to the required contour of the tire-casing. The rings 12 are each provided, at intervals around the opposite face, with guide rods 13 which pass through recesses 14 in the base of the casing 10. The tail of each rod is formed with an enlargement 15 and springs 16, each bearing at one end against the base of the recess 14 and at the other against a collar 17 fast on its rod, keep the rings normally pressed out from the casing 10 with the enlargements 15 of the guide-rods flush with the face thereof as shown in Figure 1.

Figure 2:
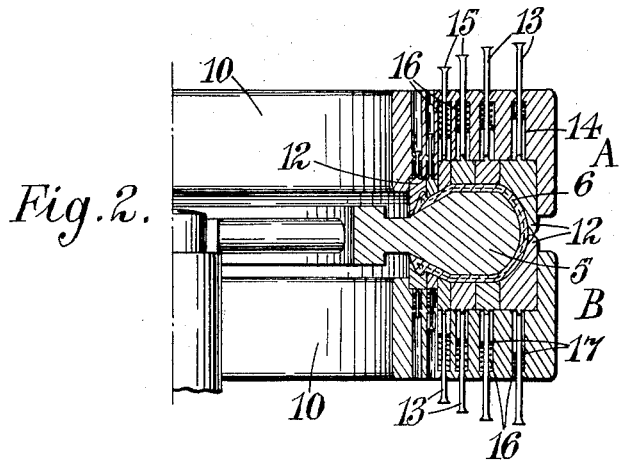
Figure 2 is a fragmentary sectional view corresponding to Figure 1, but showing the press elements in "closed" position.

The rings 12 are thus spring-pressed outwardly away from their casings 10 and the rods 13 are so proportioned that the rings project from their casings in progressively decreasing amounts from the outer to the inner rings. Thus when the press is operated to bring the plateaux together the ring of largest diameter comes first into contact with the fabric on the core followed successively by the other rings as the springs are compressed until those of smallest diameter opposite the beads are engaged, when the press is fully closed and the parts assume the position shown in Figure 2 when full pressure exerted by the press is applied to the fabric on the core. This gradual pressure from the tread to the beads ensures that the fabric is evenly laid on the core without creases and in a single operation of the press.

In order that the pressure exerted by the press shall be taken up evenly during the closing operation, the core 5 is mounted on a member 18 slidable in the lower plateaux 8 against the action of a spring 19.

Figure 3:
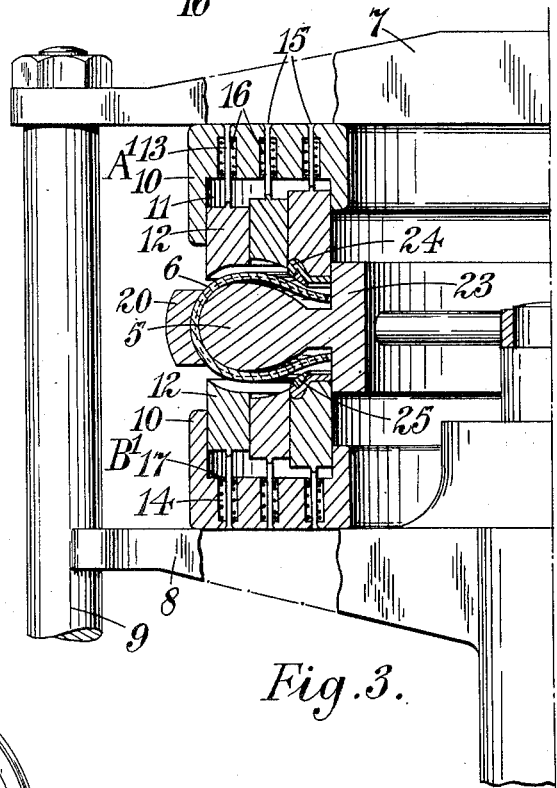
Figure 3 is a central sectional elevation of a portion of a partially closed press showing a modified arrangement of press element and the bead retaining rings.
Figure 4:
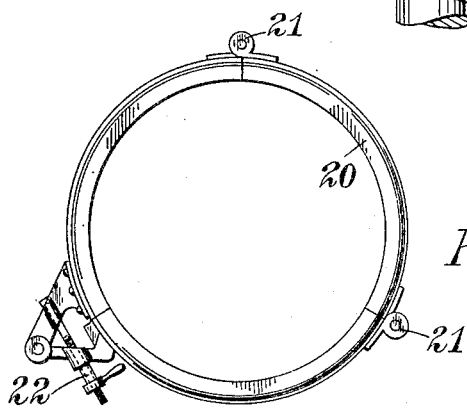
Figure 4 is a plan on a reduced scale of the clamping band shown in Figure 3.

Referring now to Figure 3. it will be seen that the construction of the press and press elements $A^1$, $B^1$ is substantially the same as that already described. In this modified arrangement, however, instead of the outer rings 12 being shaped to meet at the tread, a detachable band 20 is employed which is clamped round the tread portion of the fabric 6 on the core 5. This band is shown in Figure 4 and comprises three segments hinged together by hinges 21 and secured by means of a suitable clamping device 22.

The core 5 is formed with extended annular flange portions 23 round its base, on which are located ring-members 24 each shaped to support a bead core 25 during the laying operation. These ring-members 24 are shaped to the contour of the inner press-rings 12 and are carried thereby against the fabric on the core when the press is closed, whereupon the bead cores become attached to the fabric by adhesive solution thereon. When the press is opened the bead-supporting rings 24 are removed and if desired fresh plies of fabric are added and the press is again closed. Each of the rings 24 may be made in two or more parts to facilitate assembly in and removal from the press.

It will be appreciated that machines constructed according to this invention can be used for applying the rubber to the fabric casing to form a complete tire.

What I claim as my invention and desire to secure by Letters Patent is:

1. In a press of the character described for laying material for a pneumatic tire cover on a core, the combination with the core, of a press-element comprising a plurality of rings arranged concentrically one within another and coaxially with the throughway axis of the core, and having their operative faces, that are directed towards the material, shaped to conform to the required contour of the material on the core, which rings are resiliently mounted to move in the direction of said axis and are so arranged in relation to the core that they are adapted to come into contact with the material thereon successively commencing with the outermost ring and finishing with the innermost ring when all the beads are in contact with the material on the core, substantially as described.

2. In a press of the character described for laying material for a pneumatic tire cover on a core, the combination with the core, and two plateaux situated one at either side thereof and arranged each to move towards and away from the core, of two press-elements mounted each on one of said plateaux and having each an annular recess coaxial with the throughway axis of the core in its face directed towards the core, each press-element comprising a plurality of rings arranged concentrically one within another in its recess and having their operative faces, that are directed towards the material, shaped to conform to the required contour of the material on the core, which rings in each recess are resiliently mounted to move therein in the direction of said axis and are so arranged in relation to the core that the rings in each recess are adapted to come into contact with the material thereon successively commencing with the outer rings and finishing with the inner rings when all the rings in each recess are in contact with the material on the core, substantially as described.

3. In a press of the character described for laying material for a pneumatic tire cover on a core, the combination with a frame, a core mounted to slide axially in the frame, and two plateaux situated one at either side of the core and arranged each to move towards and away from the core, of two press-elements mounted each on one of said plateaux and having each an annular recess coaxial with the throughway axis of the core in its face directed towards the core, each press-element comprising a plurality of rings arranged concentrically one within another in its recess and having their operative faces, that are directed towards the material, shaped to conform to the required contour of the material on the core, which rings in each recess are resiliently mounted to move therein in the direction of said axis and are so arranged in relation to the core that the rings in each recess are adapted to come into contact with the material thereon successively commencing with the outer ring and finishing with the inner ring when all the rings in each recess are in contact with the material on the core, substantially as described.

4. In a press of the character described for laying fabric for a pneumatic tire cover on a core, the combination with a frame, a core resiliently mounted to slide axially therein, two plateaux situated one at either side of said core and guided in the frame each to move towards and away from the core, two press-elements mounted each on one of said plateaux and having each an annular recess coaxial witth the core in its face directed towards the latter, each press-element comprising a plurality of rings arranged concentrically one within another in its recess, which rings have their operative faces, that are directed towards the fabric, shaped to conform to the required contour of the fabric on the core, said core having at its base an annular flange extending axially towards the press-elements, and two bead-supporting ring-members removably carried each by one of said flanges in operative positional relation to one of the innermost of said rings respectively for locating the beads in position on the fabric during the laying operation, substantially as described.

5. In a press of the character described for laying material for a pneumatic tire cover on a core, the combination with the core, of a press-element comprising a plurality of one-part rings arranged concentrically one within another and coaxially with the throughway axis of the core, and having their operative faces, that are directed towards the material, shaped to conform to the required contour of the material on the core, which rings are so mounted that when in operation they automatically come into contact with the material on the core successively commencing with the outer ring near the tread portion of the tire, and finishing with the inner ring near the bead when all the rings are in contact with the material on the core, substantially as described.

In testimony whereof I affix my signature.

CLAUDE MARIE GAUTIER.